US008797861B2

(12) United States Patent
Chaudhuri et al.

(10) Patent No.: US 8,797,861 B2
(45) Date of Patent: Aug. 5, 2014

(54) SYSTEM AND METHOD FOR MOBILE INTERNET OFFLOADING IN A WIRELESS COMMUNICATION NETWORK

(75) Inventors: Saptarshi Chaudhuri, Bangalore (IN); Subhodeep Sarkar, Kolkata (IN); Soumya Shankar Sardar, Kolkata (IN)

(73) Assignee: Wipro Limited, Bangalore (IN)

( * ) Notice: Subject to any disclaimer, the term of this patent is extended or adjusted under 35 U.S.C. 154(b) by 189 days.

(21) Appl. No.: 13/594,782

(22) Filed: Aug. 25, 2012

(65) Prior Publication Data

US 2013/0242728 A1  Sep. 19, 2013

(30) Foreign Application Priority Data

Mar. 14, 2012 (IN) .............................. 942/CHE/2012
May 31, 2012 (IN) ............................ 2195/CHE/2012

(51) Int. Cl.
*H04W 4/00* (2009.01)
*H04W 28/20* (2009.01)
*H04W 76/02* (2009.01)

(52) U.S. Cl.
CPC .............. *H04W 28/20* (2013.01); *H04W 76/02* (2013.01)
USPC ............ 370/230; 370/328; 370/329; 370/401

(58) Field of Classification Search
CPC ........ H04W 28/00–28/20; H04W 4/00–4/025; H04W 76/00–76/045; H04W 8/16; H04W 12/06
USPC .......... 370/230–235, 328–401, 439; 455/411, 455/436
See application file for complete search history.

(56) References Cited

U.S. PATENT DOCUMENTS

| | | | |
|---|---|---|---|
| 2011/0075557 A1* | 3/2011 | Chowdhury et al. | 370/230 |
| 2011/0310799 A1* | 12/2011 | Horn et al. | 370/328 |
| 2012/0039213 A1* | 2/2012 | Cheng et al. | 370/254 |
| 2012/0127974 A1* | 5/2012 | Doppler et al. | 370/338 |
| 2013/0083783 A1* | 4/2013 | Gupta et al. | 370/338 |
| 2013/0208660 A1* | 8/2013 | Kanazawa et al. | 370/328 |
| 2013/0208703 A1* | 8/2013 | Sugimoto et al. | 370/331 |
| 2013/0230011 A1* | 9/2013 | Rinne et al. | 370/329 |

* cited by examiner

*Primary Examiner* — Afsar M Qureshi
(74) *Attorney, Agent, or Firm* — LeClairRyan, a Professional Corporation

(57) ABSTRACT

A system and method for mobile Internet offloading in a wireless communication network are disclosed. In one embodiment, a session is established through an Internet offload gateway (IOGW) with a mobile operator network to establish a communication with a mobile device. A packet coming from the mobile device is received by an intelligent policy manager (IPM) residing in the IOGW during the session. If the received packet is a signaling packet, offload rule flags are generated and operator defined offload policy rules are then enabled. If the received packet is a data packet, it is determined whether the operator defined offload policy rules match with session information associated the data packet. If the operator defined offload policy rules match, the data packet is offloaded to the Internet. If the operator defined offload policy rules do not match, the data packet is sent to a home gateway.

15 Claims, 8 Drawing Sheets

SYSTEM AND METHOD FOR MOBILE INTERNET OFFLOADING IN A WIRELESS COMMUNICATION NETWORK

CROSS-REFERENCE TO RELATED APPLICATIONS

Benefit is claimed under 35 U.S.C 119(a) to Indian Non Provisional Application Ser. No. 2195/CHE/2012 entitled "System and method for mobile internet offloading in a wireless communication network" by Wipro Limited filed on May 31, 2012 which claims the Indian Provisional Application Ser. No. 942/CHE/2012 entitled "Method and system for achieving mobile Internet data offloading in a wireless network" by Wipro Limited filed on Mar. 14, 2012.

TECHNICAL FIELD

Embodiments of the present subject matter relate to a wireless communication network. More particularly, embodiments of the present subject matter relate to mobile Internet offloading in the wireless communication network.

BACKGROUND

Rapid increase in mobile subscriber base and recent emergence of new applications, such as multimedia online gaming (MMOG), mobile television (TV), Web 2.0 and the like streaming contents together with increased level of penetration of data-intensive devices, such as smart phones, broadband enabled laptops, and other similar devices have resulted in an explosion of Internet data traffic going through mobile networks. While mobile network operators have historically been innovative and successful in expanding network capacity, the current rate of growth in demand is unprecedented, thereby, leading the mobile network operators to become increasingly interested in the notion of mobile data offloading, also referred to as data offloading for delivering data using complementary network technologies that were targeted for the mobile networks.

Offloading selected types of Internet protocol (IP) traffic, for example, Internet traffic, frees up capacity and thereby improves data experience of users and quality of service (QoS) on a macro network. Reduced traffic means reduced network cost (reduced capital investment and reduced operating expenses) for the mobile network operators.

As per third generation partnership project (3GPP) standard, a typical mobile network includes an Internet offload gateway (IOGW) (a selected IP traffic offload (SIPTO) module) at an Iu packet switched (IuPS) interface for a universal mobile telecommunications system (UMTS) network. Generally, the IOGW is located at the IuPS interface and provides a standard IuPS interface to a radio network controller (RNC) and a serving general packet radio service (GPRS) supporting node (SGSN) to inspect the incoming packets to determine whether the data packet is requesting access to the Internet and routes the data packet directly to the Internet based on the determination without the data packet having to go through the SGSN and a gateway GPRS supporting node (GGSN) in a mobile operator's packet core network. Typically, the IOGW is enabled by network address translation (NAT) and packet inspection based on mobile network operator's policies at different levels, for example, based on per user, per access point name (APN), per service type, per IP address and the like.

Existing techniques provide the above SIPTO solution by routing the packets based on a destination network, routing packets based on the APN specified by a connection request, routing secondary packet data protocol (PDP) context packets with QoS requirement different from primary PDP context packets, and routing packets based on the mobile network operator's requirements by fetching information from other network elements like a policy charging and rules function (PCRF) and a charging gateway function (CGF)/offline charging system (OCS) using explicit signaling. However, these mobile data offloading techniques have inefficiencies and associated issues, such as inability to handle mobile network operator's complex policy requirements and deviation from defined set of standards.

SUMMARY

A system and method for mobile Internet offloading in a wireless communication network are disclosed. According to one aspect of the present subject matter, a session is established through an Internet offload gateway (IOGW) with a mobile operator network to establish a communication with a mobile device. Further, a packet coming from the mobile device is received by an interface of an intelligent policy manager (IPM) residing in the IOGW during the session. Furthermore, it is determined whether the received packet is a signaling packet or a data packet by the IPM. In addition, offload context parameters are captured by the IPM during a connection setup phase with the mobile operator network if the received packet is the signaling packet. For example, the offload context parameters include user context parameters, operator defined offload rule flag thresholds, an IPM enabler and the like.

Moreover, offload rule flags are generated based on the user context parameters and operator defined offload rule flag thresholds by the IPM. Also, one or more operator defined offload policy rules, defined using one or more of the generated offload rule flags, are enabled by the IPM. Further, it is determined whether at least one of the one or more operator defined offload policy rules matches with session information associated with the data packet by the IPM if the received packet is the data packet. Furthermore, the data packet is offloaded to the Internet bypassing a mobile operator's packet core network by the IPM if the at least one of the one or more operator defined offload policy rules matches with the session information associated with the data packet. In addition, the data packet is sent to a home gateway in the mobile operator's packet core network by the IPM if the at least one of the one or more operator defined offload policy rules does not match with the session information associated with the data packet.

According to another aspect of the present subject matter, the system includes the mobile device, the IOGW communicatively coupled to the mobile device and the mobile operator's packet core network communicatively coupled to the IOGW. Further, the IOGW includes the IPM. Furthermore, the mobile operator's packet core network includes the home gateway. In addition, the session is established through the IOGW with the mobile operator network to establish the communication with the mobile device. Moreover, the interface of the IPM receives the packet coming from the mobile device during the session. Also, the IPM determines whether the received packet is the signaling packet or the data packet. Further, the IPM captures the offload context parameters during the connection setup phase with the mobile operator network if the received packet is the signaling packet. For example, the offload context parameters include user context parameters, operator defined offload rule flag thresholds, an IPM enabler and the like.

Furthermore, the IPM generates offload rule flags based on the user context parameters and the operator defined offload rule flag thresholds. In addition, the IPM enables the one or more operator defined offload policy rules defined using the one or more of the generated offload rule flags. Moreover, the IPM determines whether the at least one of the one or more operator defined offload policy rules matches with the session information associated with the data packet if the received packet is the data packet. Also, the IPM offloads the data packet to the Internet bypassing the mobile operator's packet core network if the at least one of the one or more operator defined offload policy rules matches with the session information associated with the data packet. Further, the IPM sends the data packet to the home gateway if the at least one of the one or more operator defined offload policy rules does not match with the session information associated with the data packet.

According to yet another aspect of the present subject matter, a non-transitory computer-readable storage medium for mobile Internet offloading in the wireless communication network, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for mobile Internet offloading in a wireless communication network are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
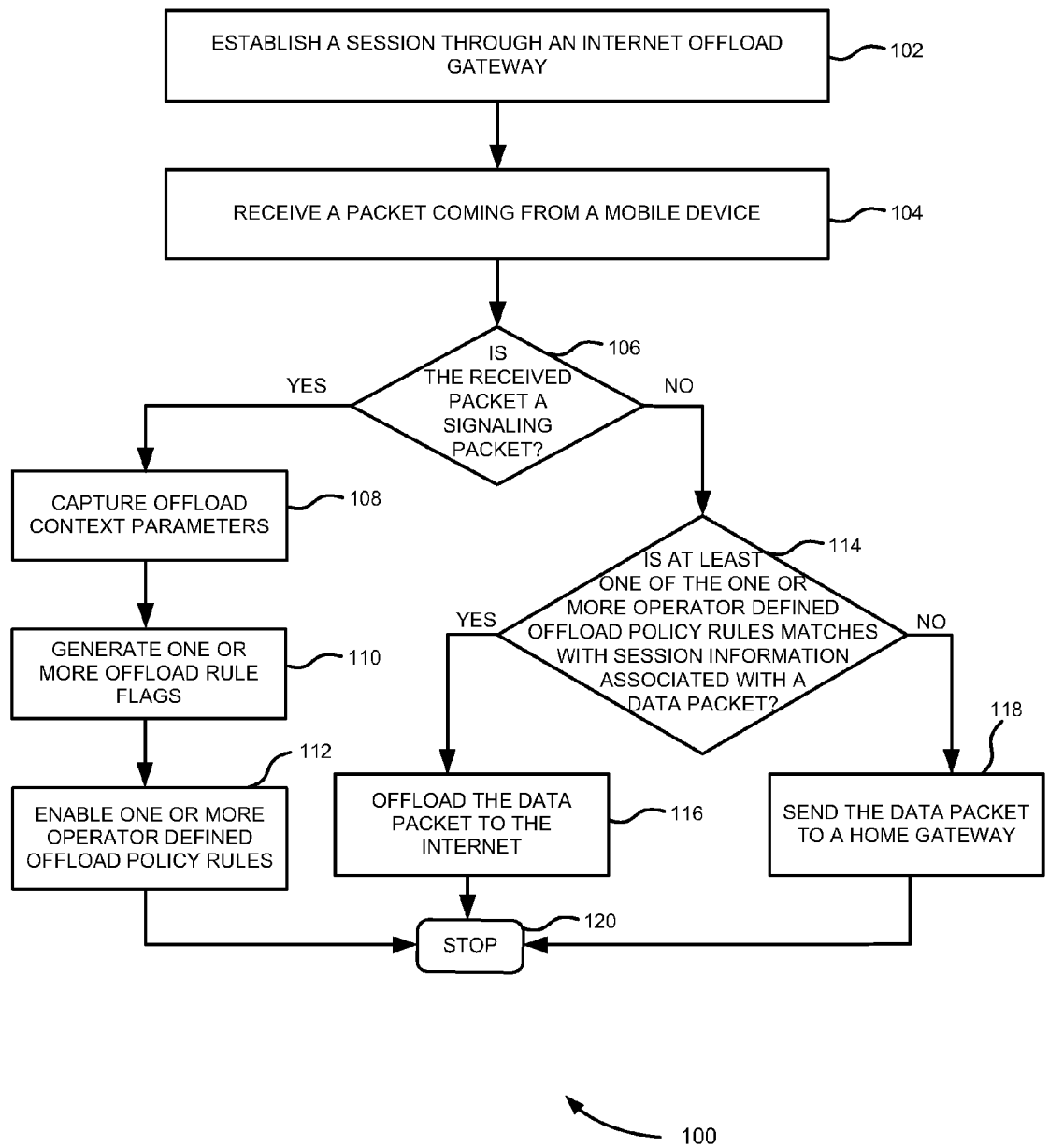
FIG. 1 illustrates a flowchart of a method for mobile Internet offloading in a wireless communication network, according to one embodiment.

FIG. 1 illustrates a flowchart 100 of a method for mobile Internet offloading in a wireless communication network, according to one embodiment. At block 102, a session is established through an Internet offload gateway (IOGW) with a mobile operator network to establish a communication with a mobile device. At block 104, a packet coming from the mobile device is received by an interface of an intelligent policy manager (IPM) residing in the IOGW during the session. For example, the interface is an Iu packet switched (IuPS) interface. At block 106, it is determined whether the received packet is a signaling packet or a data packet by the IPM.

At block 108, offload context parameters are captured by the IPM during a connection setup phase with the mobile operator network if the received packet is the signaling packet. For example, the offload context parameters include user context parameters, operator defined offload rule flag thresholds, an IPM enabler and the like. Exemplary user context parameters include non-access stratum (NAS) signaling parameters, radio access network application part (RANAP) signaling parameters, Gx signaling parameters and the like. This is explained in more detail with reference to FIG. 3. At block 110, offload rule flags are generated by the IPM based on the user context parameters and operator defined offload rule flag thresholds. For example, the offload rule flags include a quality of service (QoS) difference flag, a high-end-device flag, a routing area (RA) flag, a packet flow identifier (PFI) flag, a traffic flow template (TFT) flag, an event trigger flag, a device selected flag, a candidate radio frequency (RF) offload flag, and the like. This is explained in more detail with reference to FIG. 3.

At block 112, one or more operator defined policy rules, defined using one or more of the generated offload rule flags, are enabled. In one embodiment, the one or more operator defined of policy rules are defined using the one or more of the generated offload rule flags by a mobile network operator. At block 114, it is determined whether at least one of the one or more operator defined offload policy rules matches with session information associated with the data packet by the IPM if the received packet is the data packet. At block 116, the data packet is offloaded to the Internet bypassing a mobile operator's packet core network by the IPM if the at least one of the one or more operator defined offload policy rules matches with the session information associated with the data packet. At block 118, the data packet is sent to a home gateway in the mobile operator's packet core network by the IPM if the at least one of the one or more operator defined offload policy rules does not match with the session information associated with the data packet. At block 120, the process of mobile Internet offloading in the wireless communication network is ended upon enabling the one or more operator defined policy rules and offloading the data packet to the Internet or sending the data packet to the home gateway.

Figure 2:
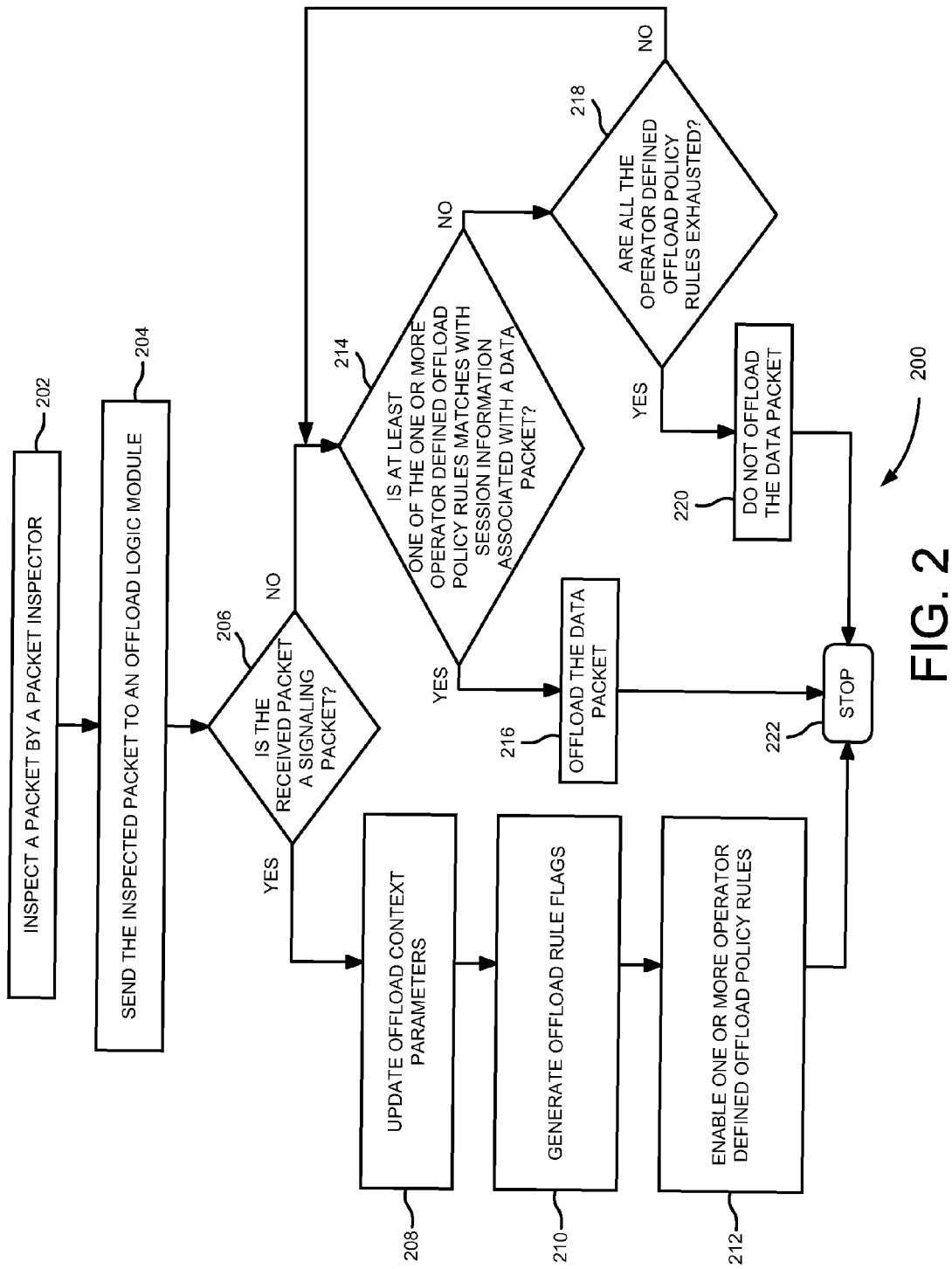
FIG. 2 illustrates another flowchart of a method for mobile Internet offloading in the wireless communication network, according to one embodiment.
Figure 3A:
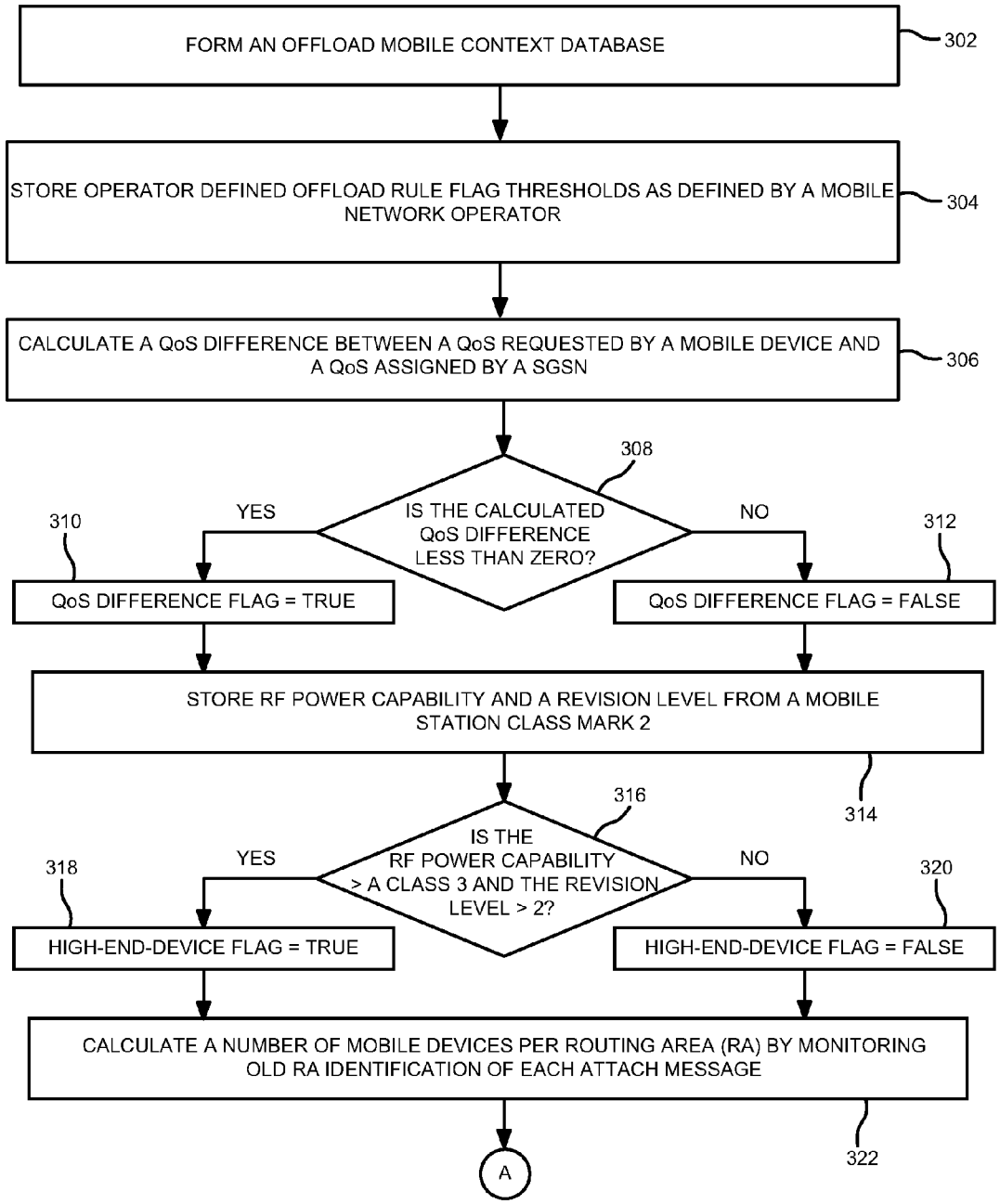
FIGS. 3A-3D illustrate yet other flowcharts of a method for mobile Internet offloading in the wireless communication network, according to one embodiment.
Figure 3B:
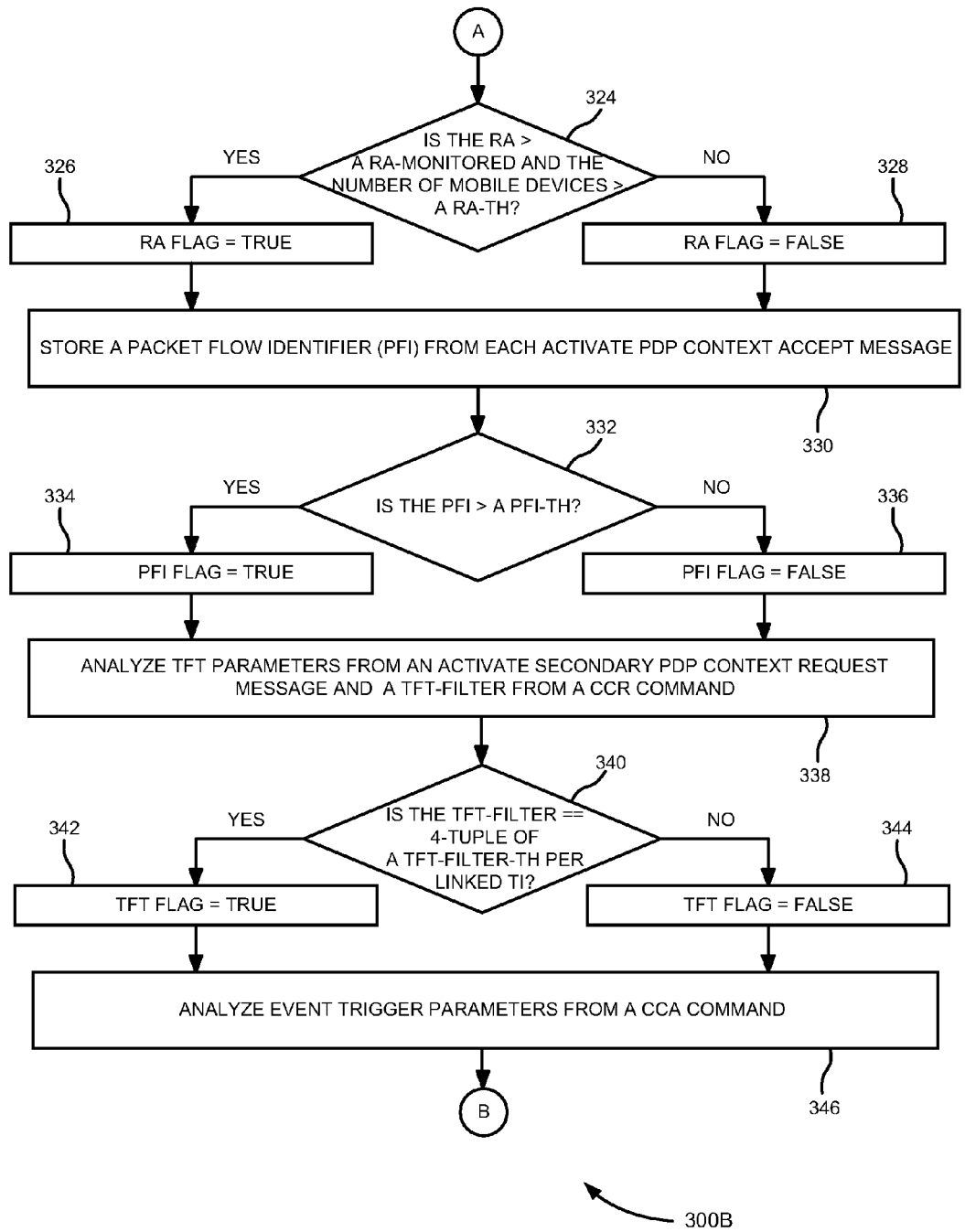
Figure 3C:
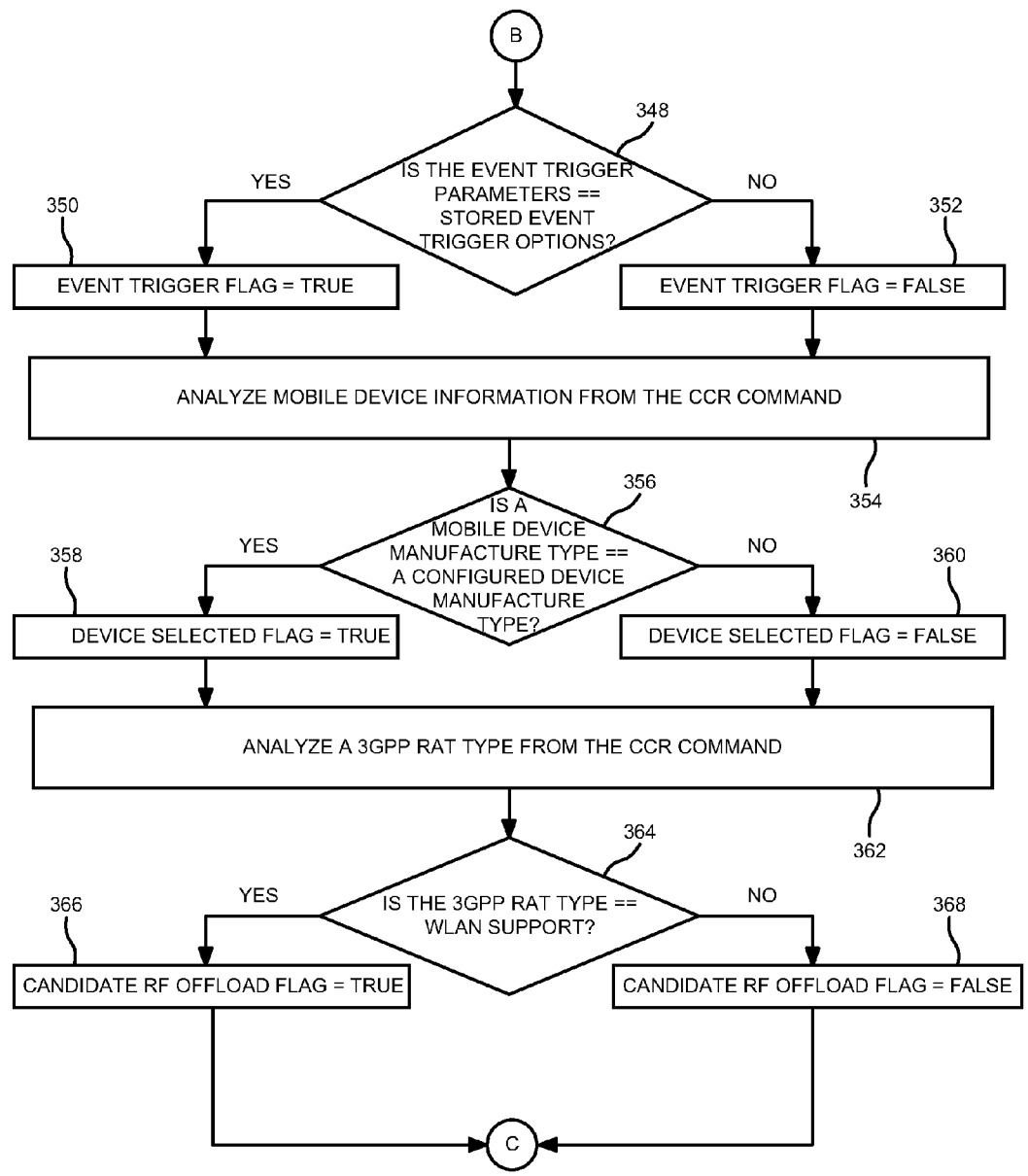
Figure 3D:
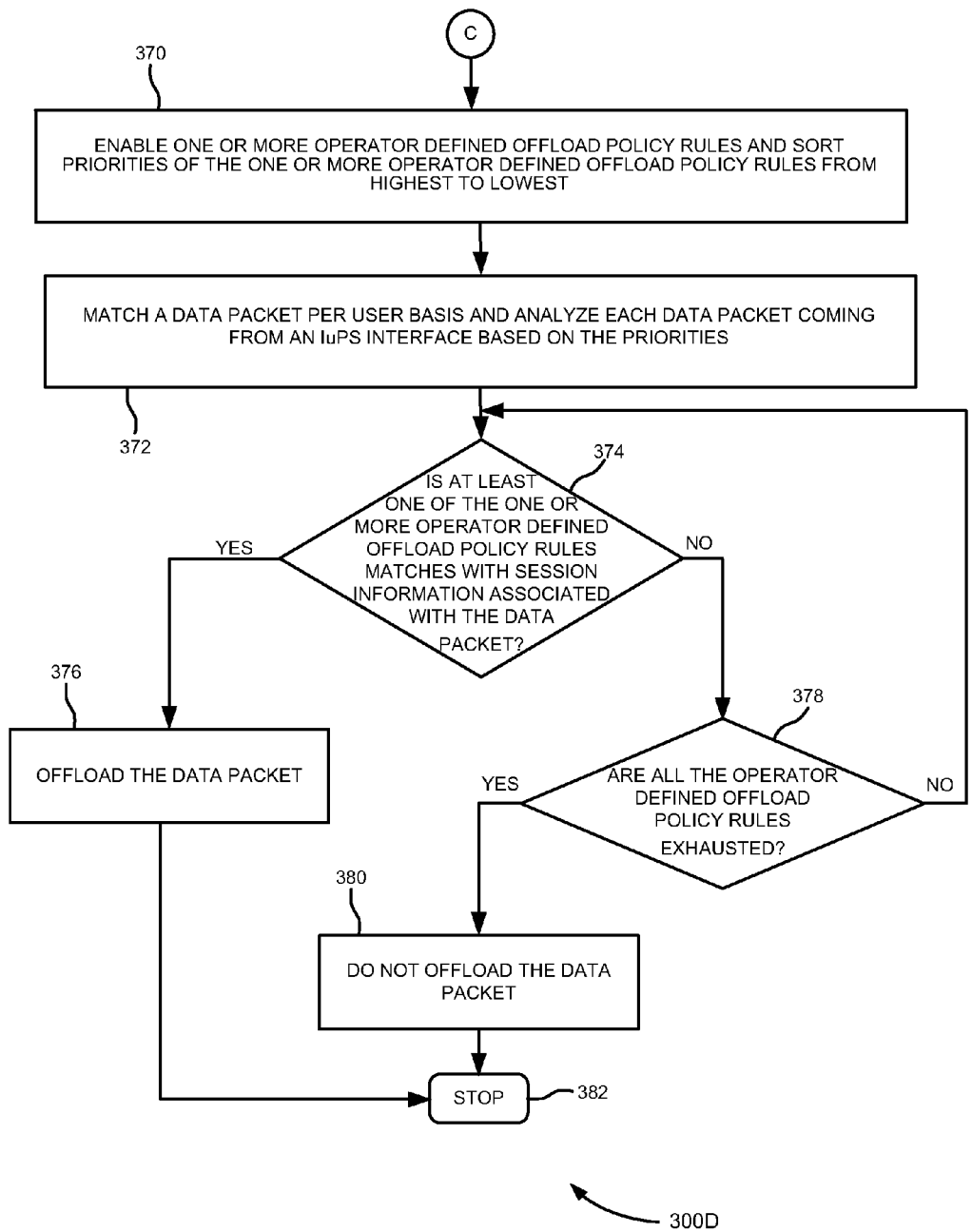

Referring now to FIG. 2, which is another flowchart 200 of a method for mobile Internet offloading in a wireless communication network, according to one embodiment. At block 202, a packet coming from a mobile device is inspected by a packet inspector residing in an IOGW during a session established with a mobile operator network. At block 204, the inspected packet is sent to an offload logic module residing in the IOGW. At block 206, it is determined whether the received packet a signaling packet or a data packet by an IPM residing in the offload logic module. At block 208, offload context parameters are updated with control signaling parameters during a connection setup phase with the mobile operator network by the IPM if the received packet is the signaling packet. For example, the offload context parameters include user context parameters, operator defined offload rule flag thresholds, an IPM enabler and the like. Exemplary user context parameters include NAS signaling parameters, RANAP signaling parameters, Gx signaling parameters and the like. Exemplary control signaling parameters include mobile station (MS) radio access capability 2, a requested QoS, a negotiated QoS, QoS information and the like.

At block 210, offload rule flags are generated based on the user context parameters and operator defined offload rule flag thresholds by the IPM. For example, the offload rule flags include a QoS difference flag, a high-end-device flag, a RA flag, a PFI flag, a TFT flag, an event trigger flag, a device selected flag, a candidate RF offload flag, and the like. This is explained in more detail with reference to FIG. 3. At block 212, one or more operator defined offload policy rules, defined using one or more of the generated offload rule flags, are enabled by the IPM. In one embodiment, the one or more offload policy rules are defined using one or more of the generated offload rule flags by a mobile network operator. At block 214, it is determined whether at least one of the one or more operator defined offload policy rules matches with session information associated with the data packet by the IPM. At block 216, the data packet is offloaded to the Internet bypassing a mobile operator's packet core network, by the IPM, if the at least one of the one or more operator defined offload policy rules matches with the session information associated with the data packet.

At block 218, it is determined whether all the operator defined offload policy rules are exhausted if the at least one of the one or more operator defined offload policy rules does not match with the session information associated with the data packet. The process steps from block 214 are repeated if all the operator defined offload policy rules are not exhausted. At block 220, the data packet is sent to a home gateway in the mobile operator's packet core network, by the IPM, if all the operator defined offload policy rules are exhausted. At block 222, the process of mobile Internet offloading in the wireless communication network is ended upon enabling the one or more operator defined policy rules and offloading the data packet to the Internet or sending the data packet to the home gateway.

Referring now to FIGS. 3A-3D, which illustrate yet other flowcharts 300A-300D of a method for mobile Internet offloading in a wireless communication network, according to one embodiment. At block 302, an offload mobile context database is formed by analyzing various signaling parameters from various protocol messages. In one embodiment, NAS signaling parameters, RANAP signaling parameters and Gx signaling parameters are analyzed from NAS protocol messages, RANAP protocol messages and Gx protocol messages, respectively. For example, the NAS signaling parameters include old routing area (RA) identification, MS radio access capability 2, a requested QoS, a transaction identifier (TI), a PFI, a linked TI, TFT parameters, a negotiated QoS and the like. In one exemplary implementation, the old RA identification and the MS radio access capability 2 are analyzed from an attach request message, the requested QoS is analyzed from an activate packet data protocol (PDP) context request message, the TI and the PFI are analyzed from an activate PDP context accept message, the requested QoS, the linked TI and the TFT parameters are analyzed from an activate secondary PDP context request message and the negotiated QoS is analyzed from the activate PDP context accept message and an activate secondary PDP context accept message.

For example, the RANAP signaling parameters include radio access bearer (RAB) parameters and the like. In one exemplary implementation, the RAB parameters are analyzed from a RAB assignment request message. For example, the Gx signaling parameters include TFT packet filter information, TFT filter parameters, such as a source IP address, a destination IP address, a source port, a destination port and the like, QoS information, mobile device information, a third generation partnership project (3GPP) radio access technology (RAT) type, event trigger parameters and the like. In one exemplary implementation, the TFT packet filter information, the TFT filter parameters, the QoS information, the mobile device information and the 3GPP RAT type are analyzed from a credit control request (CCR) command and the event trigger parameters and the QoS information are analyzed from a credit control answer (CCA) command.

At block 304, operator defined offload rule flag thresholds are defined by a mobile network operator. At block 306, a QoS difference between a QoS requested by a mobile device and a QoS assigned by a serving general packet radio service (GPRS) supporting node (SGSN), residing in a mobile operator's packet core network, is calculated. In one embodiment, the requested QoS is analyzed either from the activate PDP context request message or the activate secondary PDP context request message and request with the RAB parameters from the RAB assignment request message. Further, the negotiated QoS is analyzed either from the activate PDP context accept message or the activate secondary PDP context accept message and accept from the QoS information of the CCA command.

At block 308, it is determined whether the calculated QoS difference is less than zero. At block 310, a QoS difference flag is set true if the calculated QoS difference is less than zero. At block 312, the QoS difference flag is set false if the calculated QoS difference is not less than zero. At block 314, RF power capability and a revision level from a MS class mark 2 are stored upon the QoS difference flag is set true or false. At block 316, it is determined whether the RF power capability is greater than a class 3 and the revision level is greater than two. At block 318, a high-end-device flag is set true if the RF power capability is greater than the class 3 and the revision level is greater than two. At block 320, the high-end-device flag is set false if the RF power capability is not greater than the class 3 and the revision level is not greater than two.

At block 322, a number of mobiles devices per RA is calculated by monitoring the old RA identification of each attach request message upon the high-end-device flag is set true or false. At block 324, it is determined whether the RA is greater than a RA-monitored and the number of mobile devices is greater than a RA-threshold (RA-TH). At block 326, a RA flag is set true if the RA is greater than the RA-monitored and the number of mobile devices is greater than the RA-TH. At block 328, the RA flag is set false if the RA is not greater than the RA-monitored and the number of mobile devices is not greater than the RA-TH.

At block 330, the PFI from each activate PDP context accept message is stored upon the RA flag is set true or false. At block 332, it is determined whether the PFI is greater than a PFI-threshold (PFI-TH). At block 334, a PFI flag is set true if the PFI is greater than the PFI-TH. At block 336, the PFI flag is set false if the PFI is not greater than the PFI-TH. At block 338, the TFT parameters are analyzed from the activate secondary PDP context request message and the TFT-filter is analyzed from the CCR command upon the PFI flag is set true or false. At block 340, it is determined whether the TFT-filter is equal to 4-tuple of a TFT-filter-threshold (TFT-filter-TH)

per the linked TI. At block 342, a TFT flag is set true if the TFT-filter is equal to 4-tuple of the TFT-filter-TH per the linked TI. At block 344, the TFT flag is set false if the TFT-filter is not equal to 4-tuple of the TFT-filter-TH per the linked TI.

At block 346, the event trigger parameters are analyzed from the CCA command upon the TFT flag is set true or false. At block 348, it is determined whether the analyzed event trigger parameters are equal to stored event trigger options. At block 350, an event trigger flag is set true if the analyzed event trigger parameters are equal to the stored event trigger options. At block 352, the event trigger flag is set false if the analyzed event trigger parameters are not equal to the stored event trigger options. At block 354, the mobile device information including mobile device manufacture type and the like is analyzed from the CCR command upon the event trigger flag is set true or false. At block 356, it is determined whether the mobile device manufacture type is equal to a configured device manufacture type. At block 358, a device selected flag is set true if the mobile device manufacture type is equal to the configured device manufacture type.

At block 360, the device selected flag is set false if the mobile device manufacture type is not equal to the configured device manufacture type. At block 362, the 3GPP RAT type is analyzed from the CCR command upon the device selected flag is set true or false. At block 364, it is determined whether the analyzed 3GPP RAT type is equal to WLAN support. At block 366, a candidate RF offload flag is set true if the analyzed 3GPP RAT type is equal to the WLAN support. At block 368, the candidate RF offload flag is set false if the analyzed 3GPP RAT type is not equal to the WLAN support.

At block 370, one or more operator defined offload policy rules, defined using one or more of the generated offload rule flags, along with defined priorities are enabled and the priorities of the one or more operator defined offload policy rules are sorted from highest to lowest upon the candidate RF offload flag is set true or false. Exemplary offload rule flags include the QoS difference flag, the high-end-device flag, the RA flag, the PFI flag, the TFT flag, the event trigger flag, the device selected flag, and the candidate RF offload flag.

At block 372, a data packet per user basis is matched and each data packet coming from an IuPS interface is analyzed based on the priorities. At block 374, it is determined whether at least one of the one or more operator defined offload policy rules matches with session information associated with the data packet. At block 376, the data packet is offloaded to the Internet bypassing the mobile operator's packet core network if the at least one of the one or more operator defined offload policy rules matches with the session information associated with the data packet. At block 378, it is determined whether all the operator defined offload policy rules are exhausted if the at least one of the one or more operator defined offload policy rules does not match with the session information associated with the data packet. The process steps from block 374 are repeated if all the operator defined offload policy rules are not exhausted. At block 380, the data packet is not offloaded to the Internet if all the operator defined offload policy rules are exhausted. In one embodiment, the data packet is sent to a home gateway in the mobile operator's packet core network if all the operator defined offload policy rules are exhausted. At block 382, the process of mobile Internet offloading in the wireless communication network is ended upon offloading the data packet to the Internet or sending the data packet to the home gateway.

Figure 4:
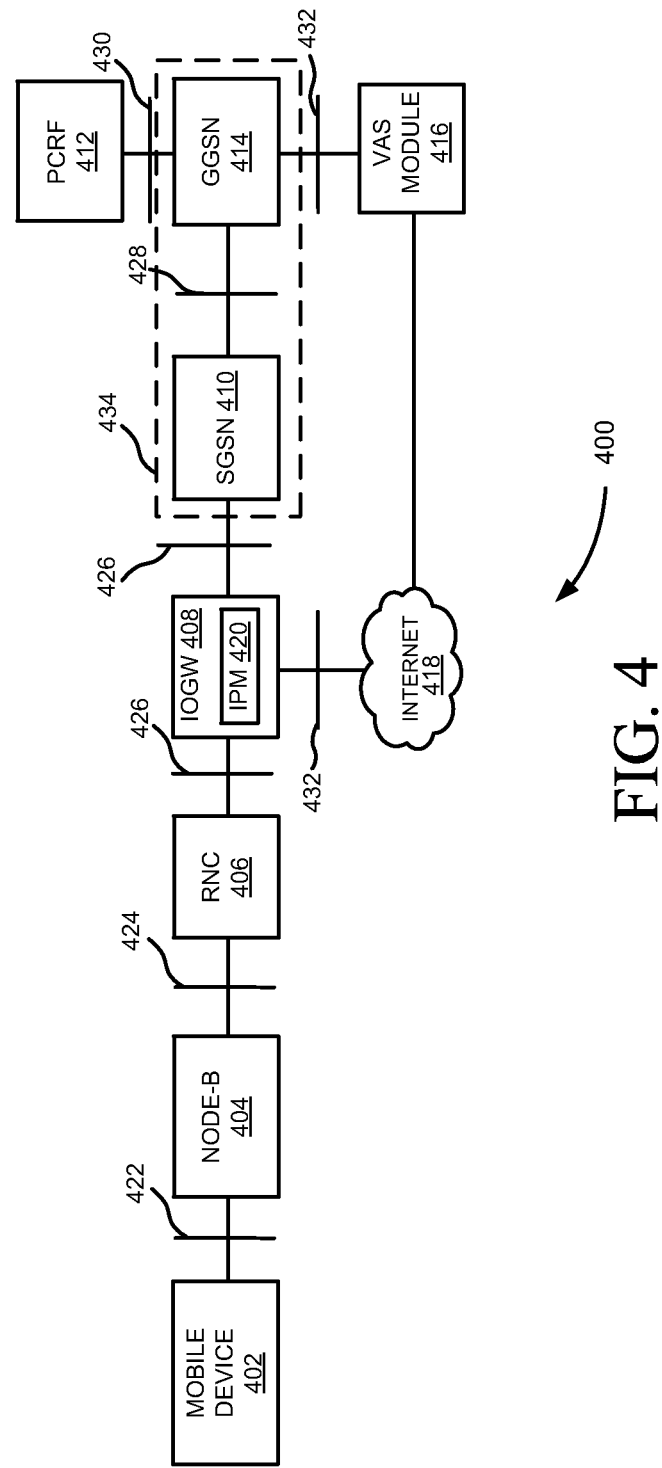
FIG. 4 illustrates a block diagram including major components of a universal mobile telecommunications system (UMTS) network for performing mobile Internet offloading, such as shown in FIGS. 1, 2 and 3A-3D, according to one embodiment.

FIG. 4 illustrates a block diagram 400 including major components of a universal mobile telecommunications system (UMTS) network for performing mobile Internet offloading, such as shown in FIGS. 1, 2 and 3A-3D, according to one embodiment. As shown in FIG. 4, the UMTS network includes a mobile device 402, a node-B 404, a radio network controller (RNC) 406, an IOGW 408, a mobile operator's packet core network 434, a policy and charging rules function (PCRF) 412, and a value added services (VAS) module 416. Further as shown in FIG. 4, the IOGW 408 includes an IPM 420. Furthermore as shown in FIG. 4, the mobile operator's packet core network 434 includes a SGSN 410 and a gateway GPRS support node (GGSN) 414. In addition, the UMTS network includes network interfaces, such as a Uu interface 422, an IuB interface 424, an IuPS interface 426, a Gn interface 428, a Gx interface 430 and a Gi interface 432.

Moreover, the mobile device 402 is communicatively coupled to the node-B 404 via the Uu interface 422. For example, the Uu interface 422 is a radio interface between the mobile device 402 and the node-B 404. Also, the node-B 404 is communicatively coupled to the RNC 406 via the IuB interface 424. Further, the IOGW 408 is communicatively coupled to the RNC 406 and the SGSN 410 via the IuPS interface 426. Furthermore, the SGSN 410 is communicatively coupled to the GGSN 414 via the Gn interface 428. For example, the Gn interface 428 is an Internet protocol (IP) based interface between the SGSN 410 and the GGSN 414. In addition, the GGSN 414 is communicatively coupled to the PCRF 412 via the Gx interface 430. For example, the Gx interface 430 is an offline policy interface between the GGSN 414 and the PCRF 412. Moreover, the GGSN 414 is communicatively coupled to the VAS module 416 via the Gi interface 432. Also, the IOGW 408 is communicatively coupled to the Internet 418 via the Gi interface 432. For example, the Gi interface 432 is an IP based interface between the GGSN 414 and the VAS module 416 and the IOGW 408 and the Internet 418.

In one embodiment, the node-B 404 is responsible for performing radio resource management, header compression and encryption of packets coming from the mobile device 402, packet scheduling and transmission, broadcast information transfer and physical layer processing. The RNC 406 is responsible for controlling the operation of multiple node-Bs, managing resources, such as allocating capacity for data calls and the like and providing critical signalling, such as call set-up, plus switching, traffic routing functionality and the like. The SGSN 410 is a packet router interfacing a core network to an access network in which the mobile device 402 is located. The GGSN 414 is a packet router interfacing the core network with an external packet-switched network, such as the Internet, X.25 and the like. The VAS module 416 is responsible for providing non-core services, such as services fax transmissions and the like. The PCRF 412 is responsible for performing the NAS protocol message and RANAP protocol message inspection to build/remove local offload context, packet inspection and policy enforcement, charging, lawful interception, and mobility management. The IOGW 408 located at the IuPS interface 426 provides a standard IuPS interface to the RNC 406 and the SGSN 410 and enables the IPM 420 to perform the mobile internet offloading.

In one exemplary implementation, a session is established through the IOGW 408 with a mobile operator network to establish a communication with the mobile device 402. Further, an interface of the IPM 420 receives a packet coming from the mobile device 402 during the session. For example, the interface is the IuPS interface 426. Furthermore, the IPM 420 determines whether the received packet is a signaling packet or a data packet. In addition, the IPM 420 captures offload context parameters during a connection setup phase with the mobile operator network if the received packet is the signaling packet. Exemplary offload context parameters include user context parameters, operator defined offload rule flag thresholds, an IPM enabler and the like. For example, the user context parameters include NAS signaling parameters, RANAP signaling parameters and Gx signaling parameters.

In addition, the IPM 420 generates offload rule flags based on the user context parameters and operator defined offload rule flag thresholds. Exemplary offload rule flags include a QoS difference flag, a high-end-device flag, a RA flag, a PFI flag, a TFT flag, an event trigger flag, a device selected flag, and a candidate RF offload flag. Moreover, the IPM 420 enables one or more operator defined offload policy rules defined using one or more of the generated offload rule flags. In one embodiment, the one or more operator defined offload policy rules are defined using the one or more of the generated offload rule flags by a mobile network operator. Also, the IPM 420 determines whether at least one of the one or more operator defined offload policy rules matches with session information associated with the data packet if the received packet is the data packet. Further, the IPM 420 offloads the data packet to the Internet 418 bypassing the mobile operator's packet core network 434 if the at least one of the one or more operator defined offload policy rules matches with the session information associated with the data packet. Furthermore, the IPM 420 sends the data packet to a home gateway in the mobile operator's packet core network 434 if the at least one of the one or more operator defined offload policy rules does not match with the session information associated with the data packet. In one embodiment, the home gateway is the SSGN 410 in the mobile operator's packet core network 434.

Figure 5:
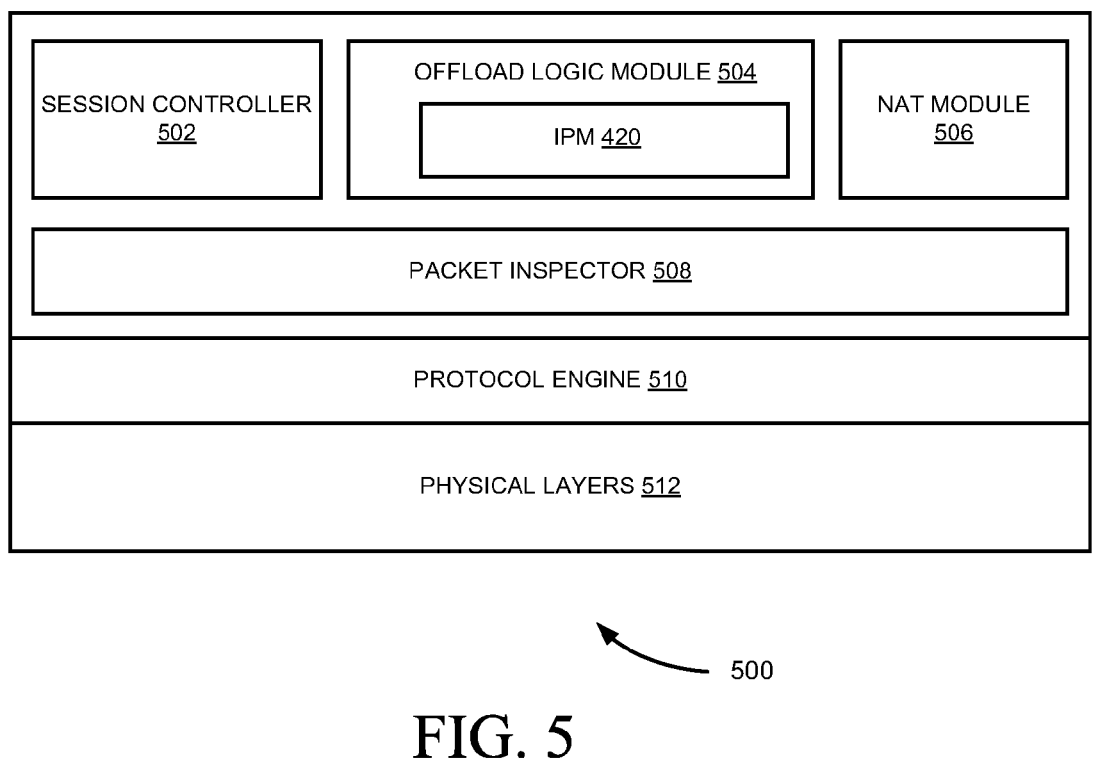
FIG. 5 illustrates a block diagram including major modules of an Internet offload gateway (IOGW), such as shown in FIG. 4, according to one embodiment.

Referring now to FIG. 5, which is a block diagram 500 including major modules of the IOGW 408, such as shown in FIG. 4, according to one embodiment. As shown in FIG. 5, the IOGW 408 includes a session controller 502, an offload logic module 504, a network address translation (NAT) module 506, a packet inspector 508, a protocol engine 510, and physical layers 512. Further, the offload logic module 504 includes the IPM 420.

In one embodiment, the physical layers 512 are used for communication with the RNC 406 and the SGSN 410, such as those shown in FIG. 4, over the IuPS interface 426. The protocol engine 510 is responsible for handling of control and user plane protocols, such as user datagram protocol (UDP), and the like messages based on current state of the protocol engine 510. For example, the protocol engine 510 is a multi-layered protocol engine. The packet inspector 508 is responsible for inspecting uplink and downlink packets coming from the RNC 406 and the SGSN 410 to determine whether a particular connection is accessing the internet bound traffic. The NAT module 506 is responsible for modifying IP address information in packet headers while in transit across the IOGW 408 for providing a seamless IuPS interface. The session controller 502 is responsible for performing session management signalling for offload traffic and traffic going through the mobile operator's packet core network 434, such as shown in FIG. 4, for effective handling of various states. The offload logic module 504 holds various operator defined offload policies and enables the IPM 420 to perform mobile Internet offloading in the wireless communication network. This is explained more in detailed with reference to FIG. 4.

In various embodiments, systems and methods described with reference to FIGS. 1 through 5 propose the IPM residing in the IOGW for mobile Internet offloading in the wireless communication network. Further, the IPM can be turned on and off depending on IOGW dynamic behavior or a mobile network operator's initial static configuration. Furthermore, the IPM performs an efficient mobile Internet offloading based on the operator defined offload policy rules with defined priorities.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents

What is claimed is:

1. A method for mobile Internet offloading in a wireless communication network, comprising:
    establishing a session through an Internet offload gateway (IOGW) with a mobile operator network to establish a communication with a mobile device;
    receiving a packet coming from the mobile device by an interface of an intelligent policy manager (IPM) residing in the IOGW during the session;
    determining whether the received packet is a signaling packet or a data packet by the IPM;
    if the received packet is the signaling packet then, generating offload rule flags based on user context parameters and operator defined offload rule flag thresholds by the IPM;
    enabling one or more operator defined offload policy rules, defined using one or more of the generated offload rule flags, by the IPM;
    if the received packet is the data packet then, determining whether at least one of the one or more operator defined offload policy rules matches with session information associated with the data packet by the IPM;
    if so, offloading the data packet to the Internet bypassing a mobile operator's packet core network by the IPM; and
    if not, sending the data packet to a home gateway in the mobile operator's packet core network by the IPM.

2. The method of claim 1, wherein the one or more operator defined offload policy rules are defined using one or more of the generated offload rule flags by a mobile network operator.

3. The method of claim 1, wherein the interface is an Iu packet switched (IuPS) interface.

4. The method of claim 1, wherein the user context parameters are non-access stratum (NAS) signaling parameters, radio access network application part (RANAP) signaling parameters and Gx signaling parameters.

5. The method of claim 1, wherein the offload rule flags are selected from a group consisting of a quality of service (QoS) difference flag, a high-end-device flag, a routing area (RA) flag, a packet flow identifier (PFI) flag, a traffic flow template (TFT) flag, an event trigger flag, a device selected flag, and a candidate radio frequency (RF) offload flag.

6. The method of claim 1, further comprising:
    capturing offload context parameters during a connection setup phase with the mobile operator network by the IPM, wherein the offload context parameters include the user context parameters, the operator defined offload rule flag thresholds and an IPM enabler.

7. A system for mobile Internet offloading in a wireless communication network, comprising:
    a mobile device;
    an Internet offload gateway (IOGW) communicatively coupled to the mobile device, wherein the IOGW comprises an intelligent policy manager (IPM); and
    a mobile operator's packet core network communicatively coupled to the IOGW, wherein the mobile operator's packet core network comprises a home gateway, wherein a session is established through the IOGW with a mobile operator network to establish a communication with the mobile device, wherein an interface of the IPM receives a packet coming from the mobile device during the session, wherein the IPM determines whether the received packet is a signaling packet or a data packet, wherein the IPM generates offload rule flags based on user context parameters and operator defined offload rule flag thresholds if the received packet is the signaling packet, wherein the IPM enables one or more operator defined offload policy rules defined using one or more of the generated offload rule flags, wherein the IPM determines whether at least one of the one or more operator defined offload policy rules matches with session information associated with the data packet if the received packet is the data packet, wherein the IPM offloads the data packet to the Internet bypassing the mobile operator's packet core network if the at least one of the one or more operator defined offload policy rules matches with the session information associated with the data packet, and wherein the IPM sends the data packet to the home gateway if the at least one of the one or more operator defined offload policy rules does not match with the session information associated with the data packet.

8. The system of claim 7, wherein the one or more operator defined offload policy rules are defined using the one or more of the generated offload rule flags by a mobile network operator.

9. The system of claim 7, wherein the interface is an Iu packet switched (IuPS) interface.

10. The system of claim 7, wherein the user context parameters are non-access stratum (NAS) signaling parameters, radio access network application part (RANAP) signaling parameters and Gx signaling parameters.

11. The system of claim 7, wherein the offload rule flags are selected from a group consisting of a quality of service (QoS) difference flag, a high-end-device flag, a routing area (RA) flag, a packet flow identifier (PFI) flag, a traffic flow template (TFT) flag, an event trigger flag, a device selected flag, and a candidate radio frequency (RF) offload flag.

12. The system of claim 7, wherein the IPM is further configured to:
capture offload context parameters during a connection setup phase with the mobile operator network by the IPM, wherein the offload context parameters include the user context parameters, the operator defined offload rule flag thresholds and an IPM enabler.

13. The system of claim 7, wherein the IOGW is communicatively coupled to the mobile device via a radio network controller (RNC) and a node-B.

14. The system of claim 7, wherein the mobile operator's packet core network comprises a serving general packet radio service (GPRS) supporting node (SGSN) and a gateway GPRS support node (GGSN) and wherein the home gateway is the SGSN.

15. A non-transitory computer-readable storage medium for mobile Internet offloading in a wireless communication network, when executed by a computing device, cause the computing device to:
establish a session through an Internet offload gateway (IOGW) with a mobile operator network to establish a communication with a mobile device;
receive a packet coming from the mobile device by an interface of an intelligent policy manager (IPM) residing in the IOGW during the session;
determine whether the received packet is a signaling packet or a data packet by the IPM;
if the received packet is the signaling packet then, generate offload rule flags based on user context parameters and operator defined offload rule flag thresholds by the IPM;
enable one or more operator defined offload policy rules, defined using one or more of the generated offload rule flags, by the IPM;
if the received packet is the data packet then, determine whether at least one of the one or more operator defined offload policy rules matches with session information associated with the data packet by the IPM;
if so, offload the data packet to the Internet bypassing a mobile operator's packet core network by the IPM; and
if not, send the data packet to a home gateway in the mobile operator's packet core network by the IPM.

* * * * *